US010219293B2

(12) United States Patent
Lee et al.

(10) Patent No.: US 10,219,293 B2
(45) Date of Patent: Feb. 26, 2019

(54) METHOD FOR AVOIDING TRANSMITTING MAC PDU HAVING PADDING ONLY IN A D2D COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 14/818,112

(22) Filed: Aug. 4, 2015

(65) Prior Publication Data

US 2016/0128093 A1 May 5, 2016

Related U.S. Application Data

(60) Provisional application No. 62/073,031, filed on Oct. 31, 2014.

(51) Int. Cl.
*H04W 4/00* (2018.01)
*H04W 72/14* (2009.01)
*H04W 28/06* (2009.01)

(52) U.S. Cl.
CPC .......... *H04W 72/14* (2013.01); *H04W 28/065* (2013.01)

(58) Field of Classification Search
None
See application file for complete search history.

(56) References Cited

U.S. PATENT DOCUMENTS

2006/0268821 A1 11/2006 Terry
2009/0323601 A1* 12/2009 Wu .................... H04W 28/065 370/329
2010/0111032 A1 5/2010 Wu
2014/0105227 A1 4/2014 Maheshwari et al.
(Continued)

FOREIGN PATENT DOCUMENTS

EP 2665320 11/2013

OTHER PUBLICATIONS

Huawei, et al., "Options of D2D MAC PDU format," 3GPP TSG RAN WG2 Meeting #87bis, R2-144399, Oct. 2014, 4 pages.
(Continued)

*Primary Examiner* — Kwang B Yao
*Assistant Examiner* — Hardikkumar Patel
(74) *Attorney, Agent, or Firm* — Lee Hong Degerman Kang Waimey

(57) ABSTRACT

The present invention relates to a wireless communication system. More specifically, the present invention relates to a method and a device for avoiding padding only MAC PDU in a D2D communication system, the method comprising: receiving a sidelink grant from a base station (BS) when the TX UE communicates with a receiving UE (RX UE) directly; checking size of the received sidelink grant; and transmitting a Medium Access Control Protocol Data Unit (MAC PDU) including at least one byte of Radio Link Control Service Data Unit (RLC SDU) if the size of received sidelink grant is larger than a minimum size of MAC PDU including only MAC header and Radio Link Control (RLC) header for Sidelink Traffic Channel (STCH).

10 Claims, 18 Drawing Sheets

(56) References Cited

U.S. PATENT DOCUMENTS

2015/0208452 A1* 7/2015 Lee .................. H04W 36/0061
455/426.1
2015/0305080 A1* 10/2015 Xu ..................... H04W 76/023
370/329

OTHER PUBLICATIONS

PCT International Application No. PCT/KR2015/007936, Written Opinion of the International Searching Authority dated Nov. 11, 2015, 13 pages.
European Patent Office Application Serial No. 15854592.1, Search Report dated May 29, 2018, 7 pages.
Ericsson, "Introduction of ProSe", R2-144473, 3GPP TSG-RAN WG2 Meeting #87bis, Oct. 2014, 64 pages.
Catt, "Further Discussion on ProSe BSR", R2-144337, 3GPP TSG RAN WG2 Meeting #87bis, Oct. 2014, 5 pages.

* cited by examiner ( a ) Control-Plane Protocol Stack ( b ) User-Plane Protocol Stack Example of MAC PDU consisting of MAC header, MAC control elements, MAC SDUs and padding R/R/E/LCID/F/L sub-header with
7-bits L field R/R/E/LCID/F/L sub-header with
15-bits L field R/R/E/LCID sub-header

METHOD FOR AVOIDING TRANSMITTING MAC PDU HAVING PADDING ONLY IN A D2D COMMUNICATION SYSTEM AND DEVICE THEREFOR

CROSS-REFERENCE TO RELATED APPLICATIONS

Pursuant to 35 U.S.C. § 119(e), this application claims the benefit of U.S. Provisional Patent Application No. 62/073,031, filed on Oct. 31, 2014, the contents of which are all hereby incorporated by reference herein in their entirety.

BACKGROUND OF THE INVENTION

Field of the Invention

The present invention relates to a wireless communication system and, more particularly, to a method for canceling scheduling requests triggered by a sidelink buffer status report in a D2D (Device to Device) communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

SUMMARY OF THE INVENTION

The object of the present invention can be achieved by providing a method for operating by an apparatus in wireless communication system, the method comprising; receiving a sidelink grant from a base station (BS) when the TX UE communicates with a receiving UE (RX UE) directly; checking size of the received sidelink grant; and transmitting a Medium Access Control Protocol Data Unit (MAC PDU) including at least one byte of Radio Link Control Service Data Unit (RLC SDU) if the size of received sidelink grant is larger than a minimum size of MAC PDU including only MAC header and Radio Link Control (RLC) header for Sidelink Traffic Channel (STCH).

In another aspect of the present invention provided herein is an UE operating in wireless communication system, the UE comprising: a RF module; and processor configured to control the RF module, wherein the processor is configured to receive a sidelink grant from a base station (BS) when the TX UE communicates with a receiving UE (RX UE) directly, to check size of the received sidelink grant, and to transmit a Medium Access Control Protocol Data Unit (MAC PDU) including at least one byte of Radio Link Control Service Data Unit (RLC SDU) if the size of received sidelink grant is larger than a minimum size of MAC PDU including only MAC header and Radio Link Control (RLC) header for Sidelink Traffic Channel (STCH).

Preferably, the minimum size of MAC PDU includes 6 bytes of sidelink-shared channel (SL-SCH) MAC subheader, 2 bytes of MAC subheader, and 1 byte of RLC subheader.

Preferably, the minimum size of MAC PDU corresponds to 9 bytes.

Preferably, if the size of received sidelink grant is equal to or less than the minimum size of MAC PDU, the TX UE transmits a MAC PDU by including only padding bits; or the TX UE ignores and discards the received sidelink grant; or the TX UE keeps the received sidelink grant, but the TX UE does not transmit a scheduling assignment to the RX UE; or the TX UE informs the eNB of reception of erroneous sidelink.

In another aspect of the present invention provided herein is a method for operating by an apparatus in wireless communication system, the method comprising; receiving a sidelink grant from the eNB when the TX UE communicates with a receiving UE (RX UE) directly; checking size of the received sidelink grant; and transmitting a Medium Access Control Protocol Data Unit (MAC PDU) if the size of received sidelink grant is equal to or larger than 10 bytes, wherein the MAC PDU is not a MAC PDU including only padding bits.

In another aspect of the present invention provided herein is an UE operating in wireless communication system, the UE comprising: a RF module; and processor configured to control the RF module, wherein the processor is configured to receive a sidelink grant from the eNB when the TX UE communicates with a receiving UE (RX UE) directly, to check size of the received sidelink grant, and to transmit a Medium Access Control Protocol Data Unit (MAC PDU) if the size of received sidelink grant is equal to or larger than 10 bytes, wherein the MAC PDU is not a MAC PDU including only padding bits.

Preferably, if the size of received sidelink grant is equal to or larger than 10 bytes, the MAC PDU is generated by including at least one byte of Radio Link Control Service Data Unit (RLC SDU).

Preferably, the 10 bytes includes 6 bytes of sidelink-shared channel (SL-SCH) MAC subheader, 2 bytes of MAC subheader, 1 byte of RLC subheader, and 1 byte of RLC SDU.

Preferably, if the received sidelink grant is less than the 10 bytes, the processor is configured to transmit a MAC PDU by including only padding bits; or the processor is configured to ignore and discard the received sidelink grant; or the processor is configured to keep the received sidelink grant, but the processor is configured not to transmit a scheduling assignment to the RX UE; or the processor is configured to inform the eNB of reception of erroneous sidelink.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
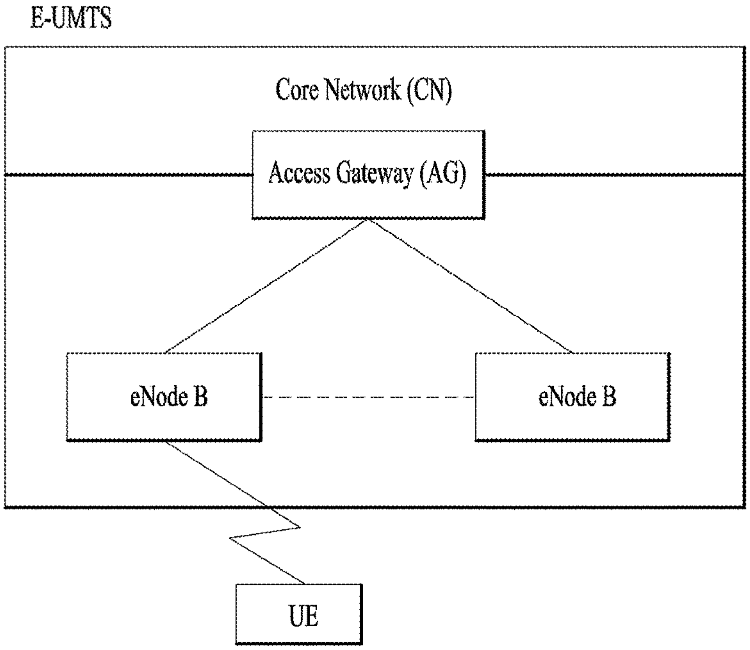
FIG. 1 is a diagram showing a network structure of an Evolved Universal Mobile Telecommunications System (E-UMTS) as an example of a wireless communication system.
Figure 2A:
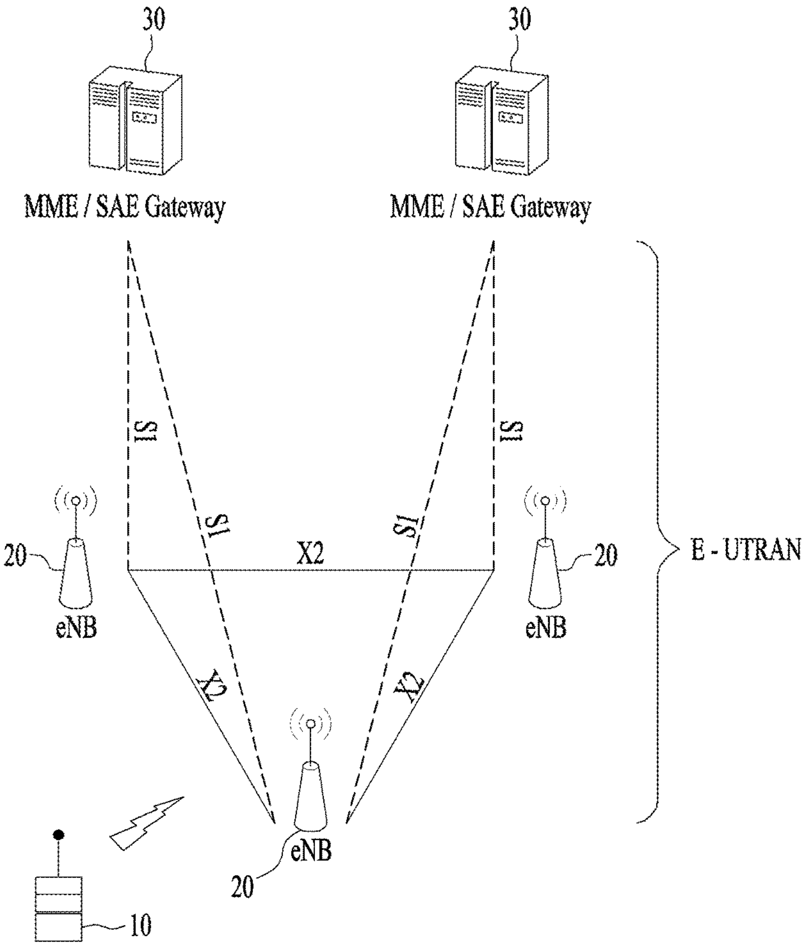
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
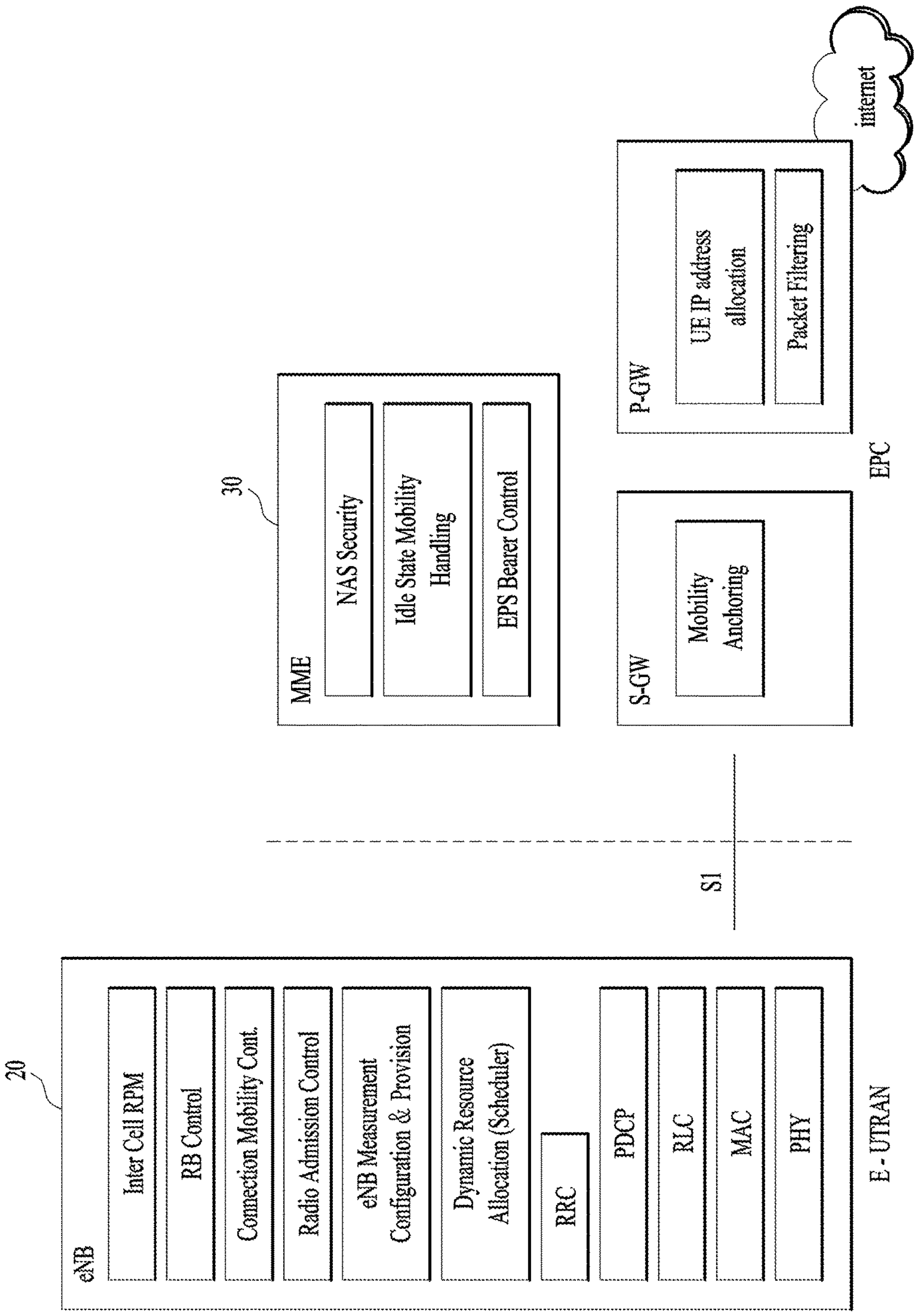
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
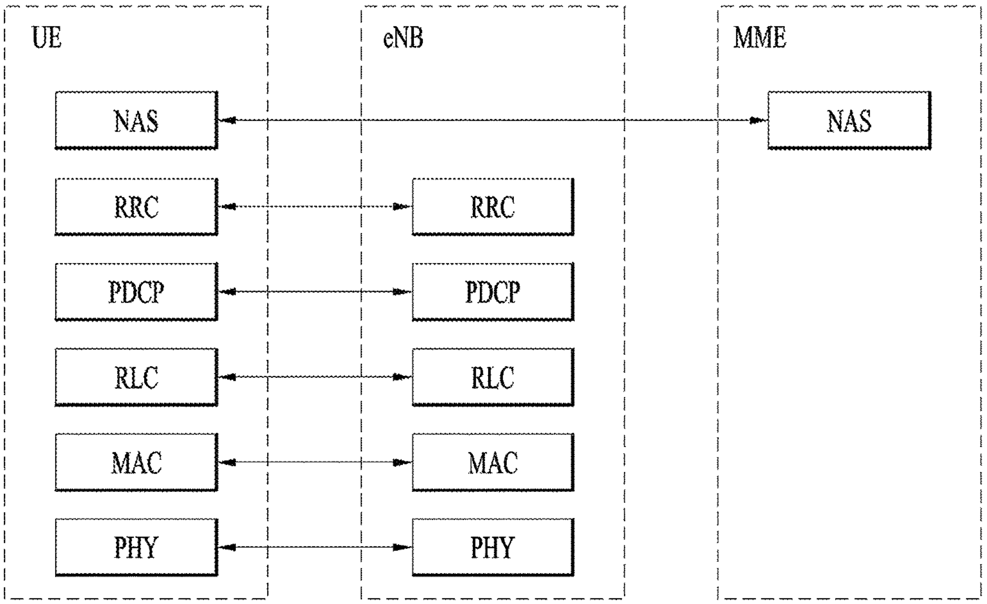
FIG. 3 is a diagram showing a control plane and a user plane of a radio interface protocol between a UE and an E-UTRAN based on a 3rd generation partnership project (3GPP) radio access network standard.
Figure 3:
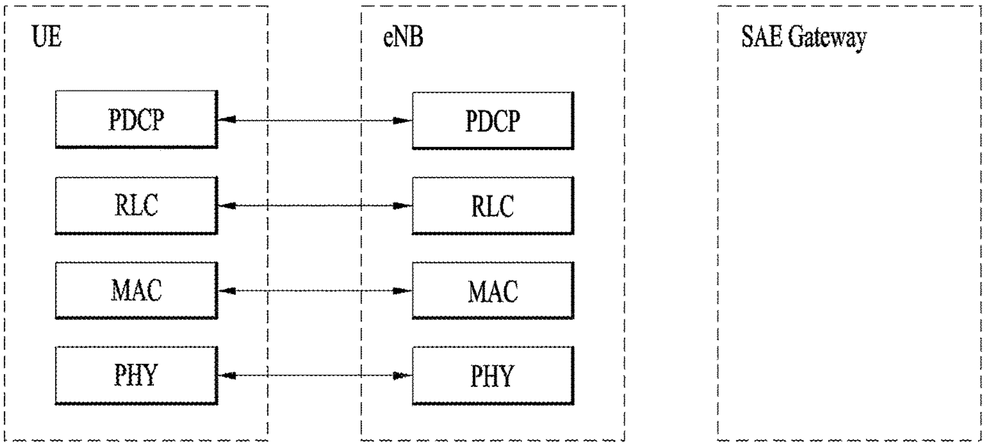

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
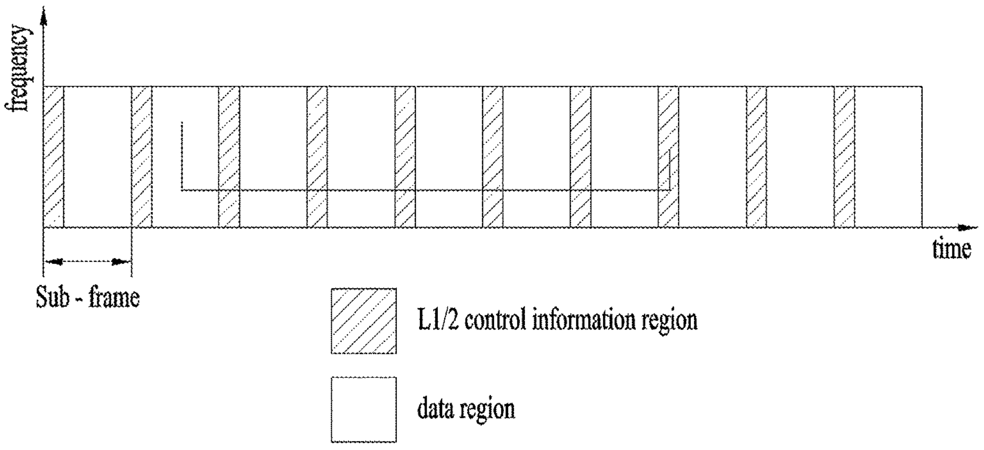
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
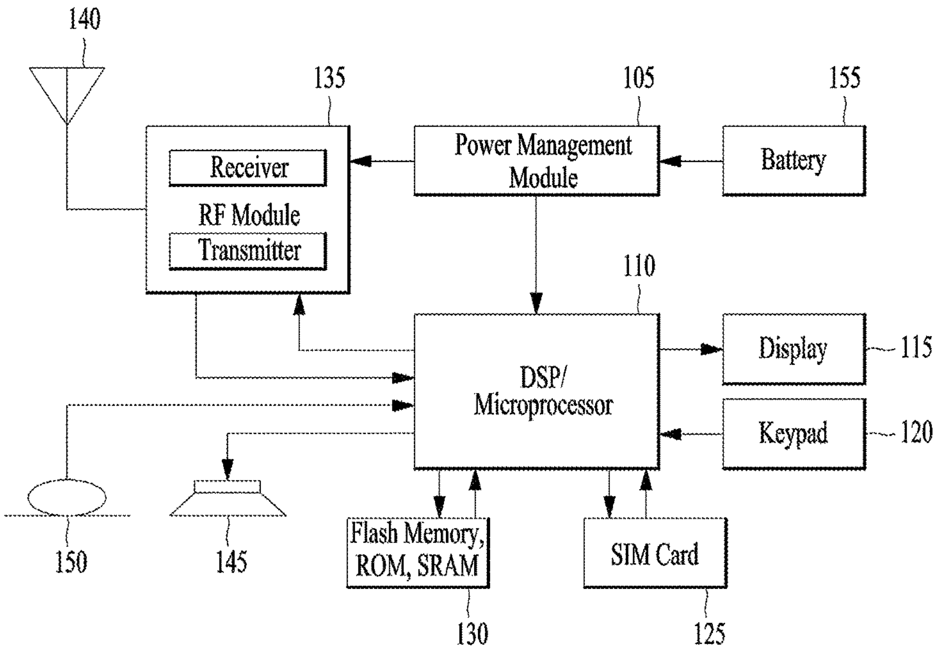
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
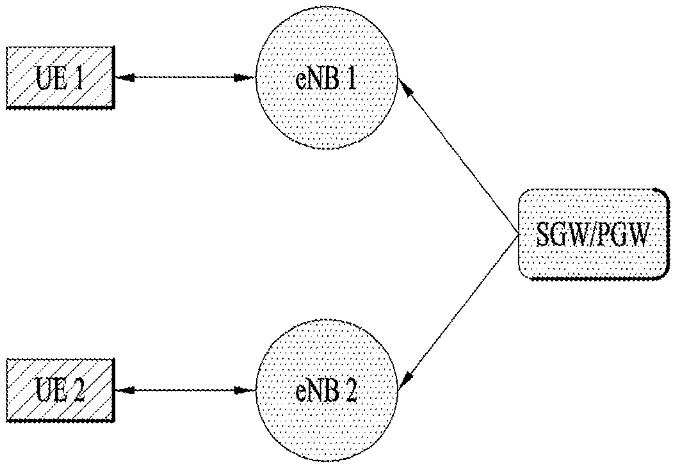
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
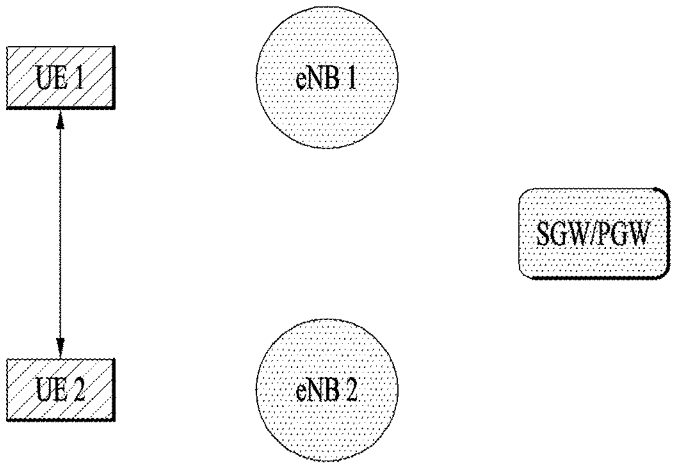
FIGS. 7 and 8 are examples of data path scenarios for a proximity communication.
Figure 8:
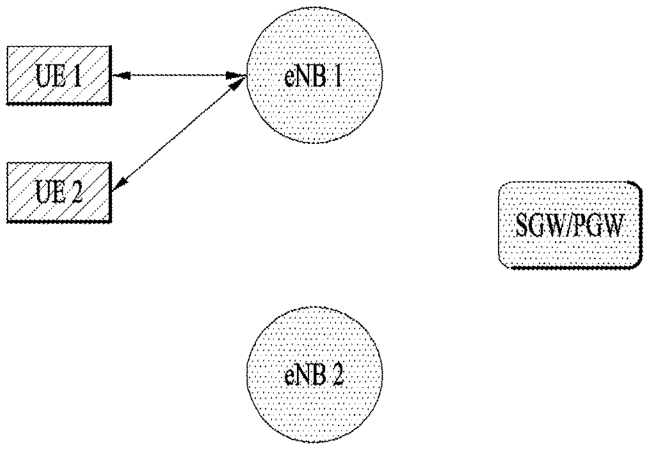

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
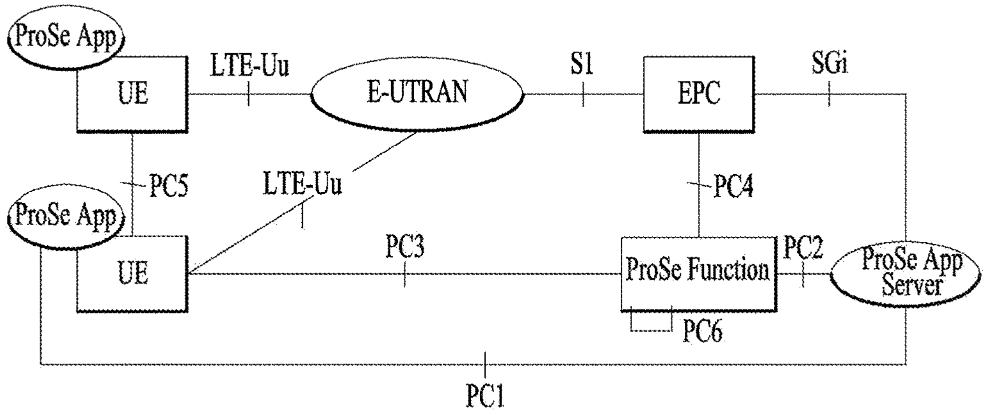
FIG. 9 is a conceptual diagram illustrating for a non-roaming reference architecture.

FIG. 9 is a conceptual diagram illustrating for a non-roaming reference architecture.

PC1 to PC5 represent interfaces. PC1 is a reference point between a ProSe application in a UE and a ProSe App server. It is used to define application level signaling requirements. PC2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:

- Interworking via a reference point towards the 3rd party Applications
- Authorization and configuration of the UE for discovery and Direct communication
- Enable the functionality of the EPC level ProSe discovery
- ProSe related new subscriber data and/handling of data storage; also handling of ProSe identities;
- Security related functionality
- Provide Control towards the EPC for policy related functionality
- Provide functionality for charging (via or outside of EPC, e.g. offline charging)

Especially, the following identities are used for ProSe Direct Communication:

- Source Layer-2 ID identifies a sender of a D2D packet at PC5 interface. The Source Layer-2 ID is used for identification of the receiver RLC UM entity;
- Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
- SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
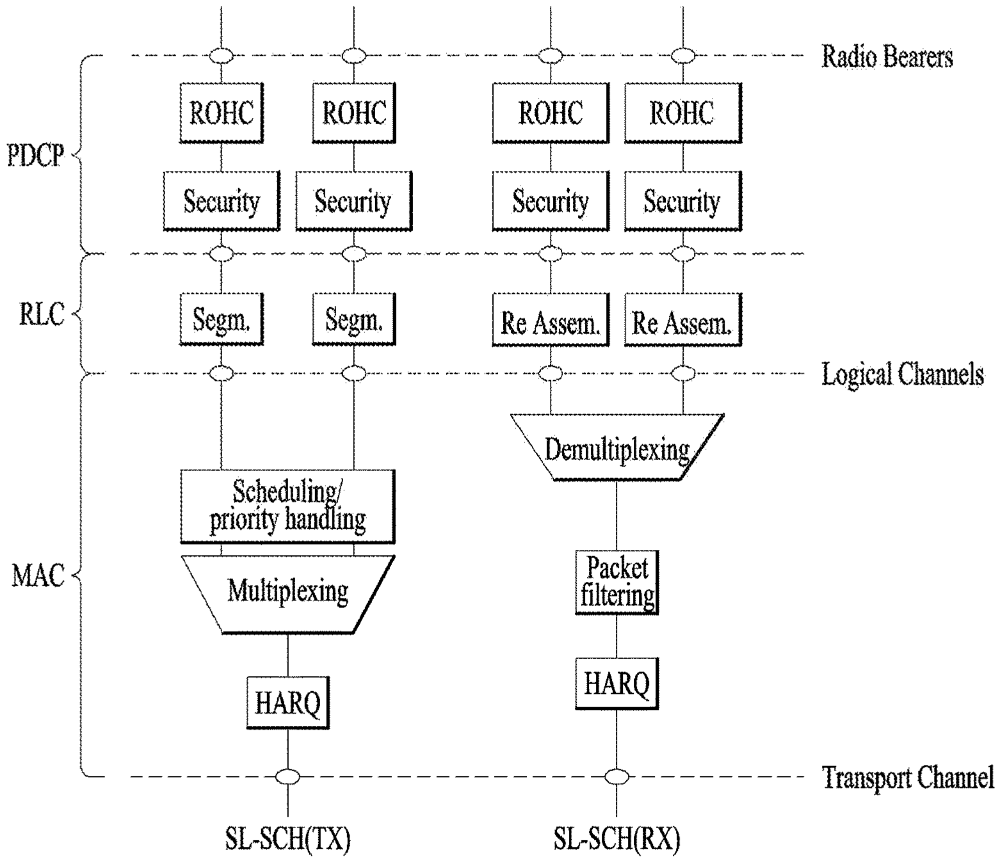
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

- Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.
- Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

- Physical Sidelink control channel: PSCCH is mapped to the Sidelink control resources. PSCCH indicates resource and other transmission parameters used by a UE for PSSCH.
- Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.
- Physical channel procedure: for in-coverage operation, the power spectral density of the sidelink transmissions can be influenced by the eNB.

Figure 11A:
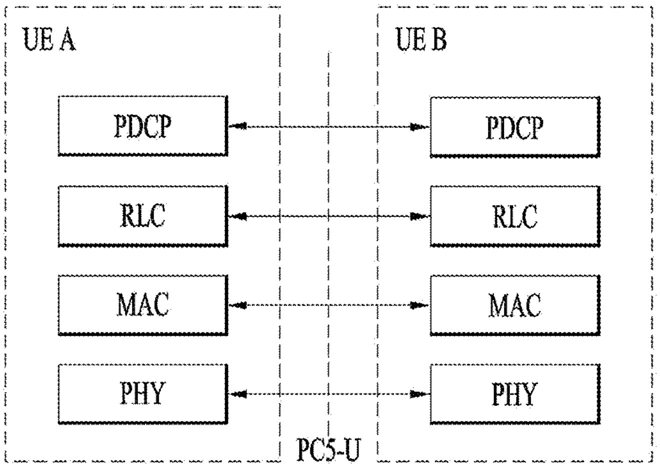
FIG. 11A is a conceptual diagram illustrating for User-Plane protocol stack for ProSe Direct Communication.
Figure 11B:
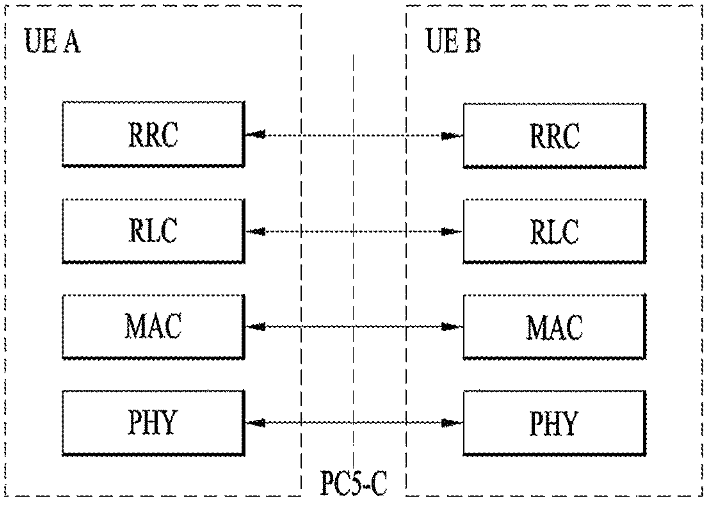
FIG. 11B is Control-Plane protocol stack for ProSe Direct Communication.

FIG. 11A is a conceptual diagram illustrating for User-Plane protocol stack for ProSe Direct Communication, and FIG. 11B is Control-Plane protocol stack for ProSe Direct Communication.

FIG. 11A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11A.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11B shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
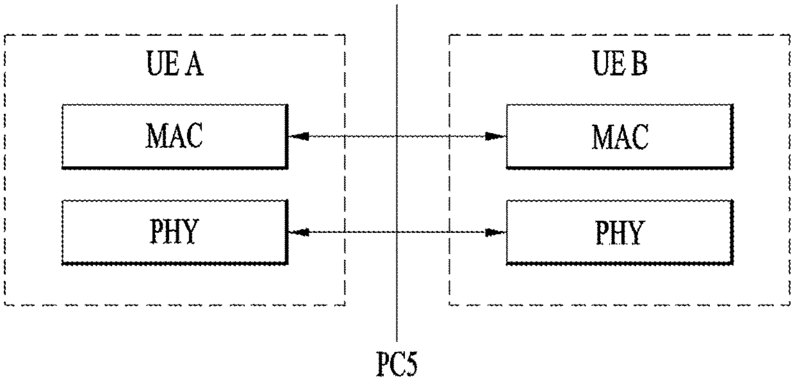
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signaled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

In ProSe communication, in MAC, the SL-SCH subheader consists of the seven header fields V/R/R/R/R/SRC/DST, which are total 6 bytes, and in RLC, only RLC UM is used.

FIGS. 13A to 13E are conceptual diagrams illustrating for a MAC PDU structure.

A MAC PDU consists of a MAC header, zero or more MAC Service Data Units (MAC SDU), zero, or more MAC control elements, and optionally padding; as described in Figure 6.1.X-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU, a MAC control element or padding.

The SL-SCH subheader consists of the seven header fields V/R/R/R/R/SRC/DST.

A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID.

MAC PDU subheaders have the same order as the corresponding MAC control elements, MAC SDUs and padding.

MAC control elements are always placed before any MAC SDUs.

Padding occurs at the end of the MAC PDU, except when single-byte or two-byte padding is required. Padding may have any value and the UE shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 13A:
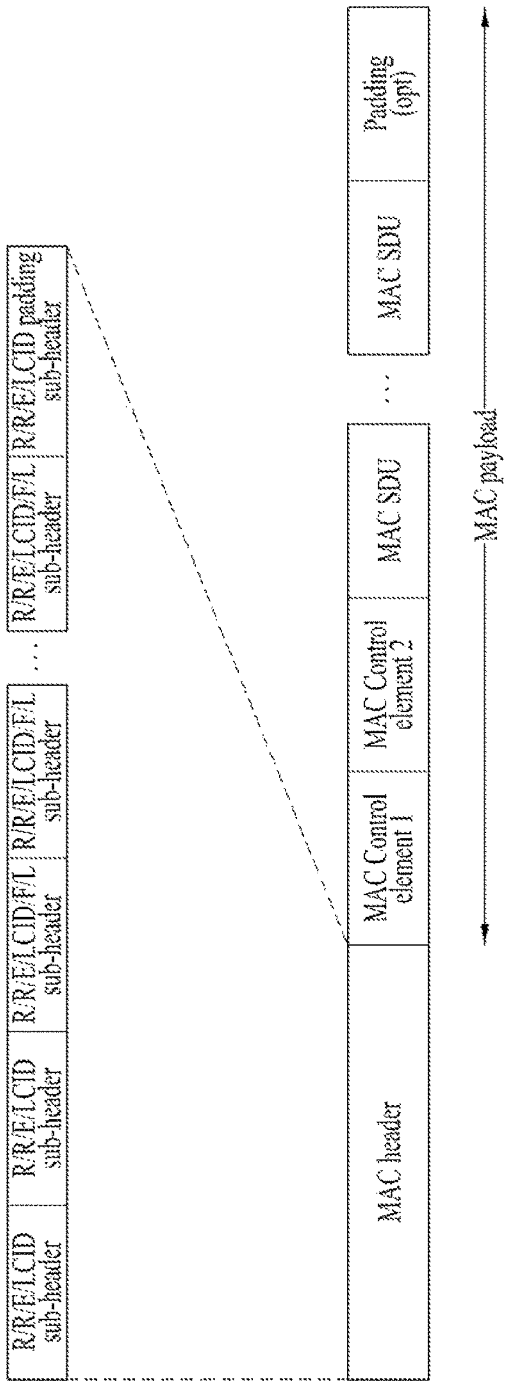
FIGS. 13A, 13B, 13C, 13D and 13E are conceptual diagrams illustrating for a MAC PDU structure.
Figure 13B:
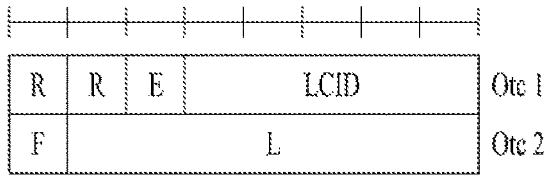
Figure 13C:
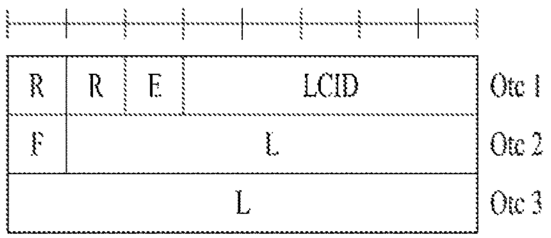
Figure 13D:
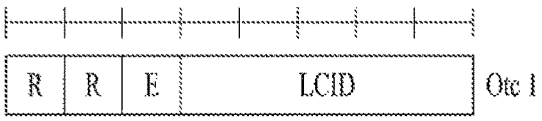

FIG. 13B is a R/R/E/LCID/F/L sub-header with 7-bits L field, FIG. 13C is a R/R/E/LCID/F/L sub-header with 15-bits L field, FIG. 13D is a R/R/E/LCID MAC subheader.

The MAC header is of variable size and consists of the following fields:

1) LCID: The Logical Channel ID field identifies the logical channel instance of the corresponding MAC SDU or the type of the corresponding MAC control element or padding as described in Tables 1, Table 2 and Table 3 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits.

TABLE 1

Values of LCID for DL-SCH

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 2

Values of LCID for UL-SCH

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 3

Values of LCID for MCH

| Index | LCID values |
|---|---|
| 00000 | MCCH (see note) |
| 00001-11100 | MTCH |
| 11101 | Reserved |
| 11110 | MCH Scheduling Information |
| 11111 | Padding |

NOTE:
If there is no MCCH on MCH, an MTCH could use this value.

2) L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field.

3) F: The Format field indicates the size of the Length field as indicated in Table 4. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1.

TABLE 4

Values of F field

| Index | Size of Length field (in bits) |
|---|---|
| 0 | 7 |
| 1 | 15 |

4) E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte.

5) R: Reserved bit, set to "0".

In the legacy system, the Logical Channel ID (LCID) is used to identify the logical channel instance of the corresponding MAC SDU or the type of the corresponding MAC control element or padding. There is one LCID field for each MAC SDU, MAC control element or padding included in the MAC PDU. The Logical Channel ID is allocated for each logical channel when the Radio Bearer is setup. Currently, there are 8 values available for data radio bearer (3 to 10).

Figure 13E:
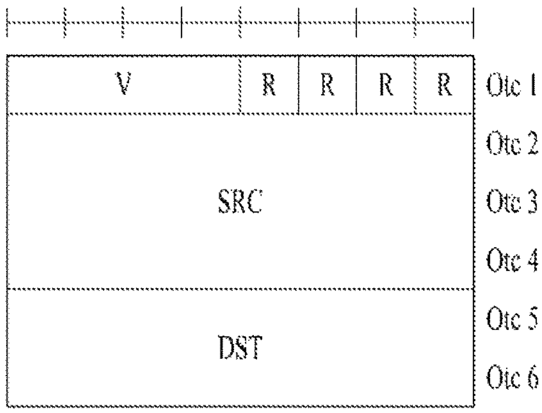

FIG. 13E is SL-SCH MAC subheader. The MAC subheader in FIG. 14 consists of the seven header fields V/R/R/R/R/SRC/DST. The MAC header is of variable size and consists of the following fields: i) 'V' is a MAC PDU format version number field indicates which version of the SL-SCH subheader is used. In this version of the specification only one format version is defined, and this field shall therefore be set to "0001". The V field size is 4 bits, ii) 'SRC' is the source ID (or Source Layer-2 ID field) carries the identity of the source. It is set to the ProSe UE ID. The SRC field size is 24 bits, iii) 'DST' is a DST field carries the 16 most significant bits of a target ID (or Destination Layer-2 ID). The Destination Layer-2 ID is set to the ProSe Layer-2 Group ID, iv) 'R' is a reserved bit, set to "0".

The source ID (SRC) identifies the sender of the data in sidelink ProSe Direct Communication. The source ID is 24 bits long and is used together with ProSe Layer-2 Group ID and LCID for identification of the RLC UM entity and PDCP entity in the receiver.

The target ID (DST) identifies the target of the data in sidelink ProSe Direct Communication. The target ID is 24 bits long and is split in the MAC layer into two bit strings:

i) One bit string is the LSB part (8 bits) of target ID and forwarded to physical layer as Sidelink Control Layer-1 ID. This identifies the target of the intended data in Sidelink Control and is used for filtering of packets at the physical layer. ii) Second bit string is the MSB part (16 bits) of the target ID and is carried within the MAC header. This is used for filtering of packets at the MAC layer.

No Access Stratum signaling is required for group formation and to configure source ID, target ID and Sidelink Control L1 ID in the UE. These identities are either provided by higher layer or derived from identities provided by higher layer. In case of groupcast and broadcast, the ProSe UE ID provided by higher layer is used directly as the source ID and the ProSe Layer-2 Group ID provided by higher layer is used directly as the target ID in the MAC layer.

The source ID can be indicated by a higher layer or generated by a source UE itself. If each UE generates its own D2D-ID by itself before executing D2D communication, the problem is that each generated D2D-ID may be same, in which case the D2D communication would not last. There should be some methods defined for handling D2D-ID collision case.

Figure 14:
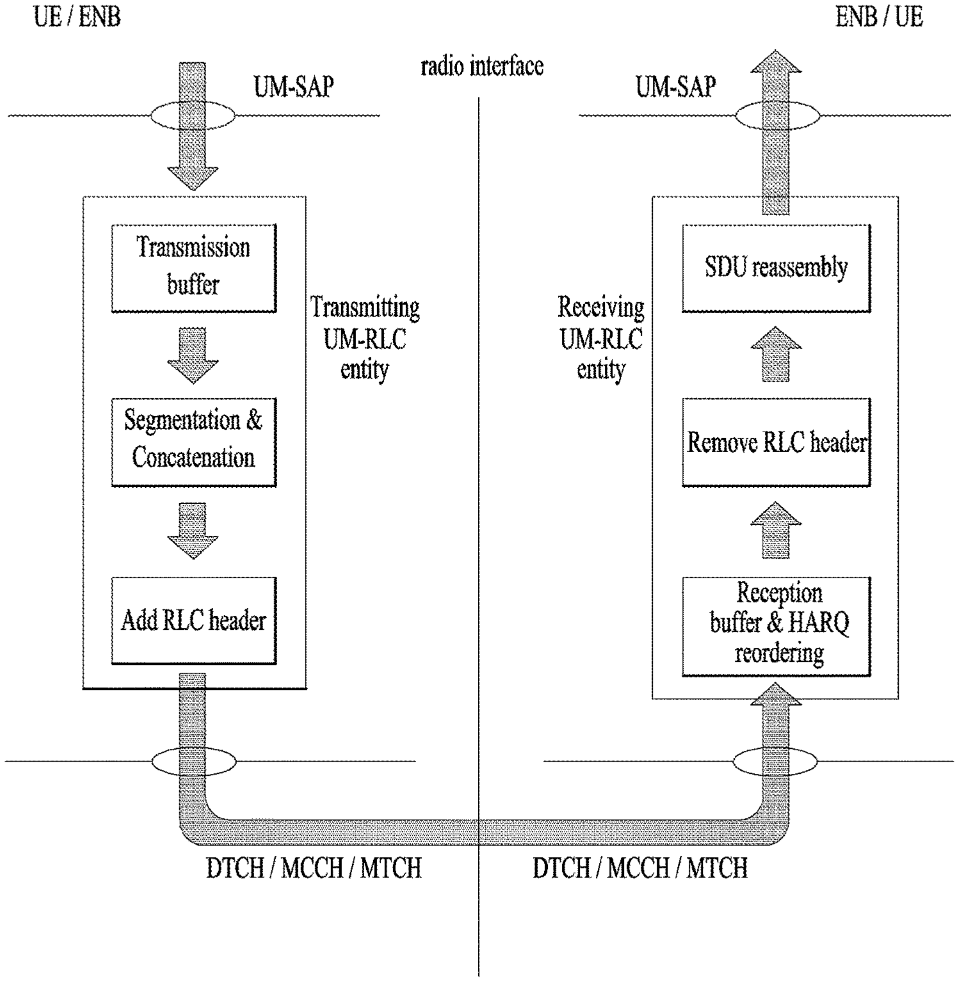
FIG. 14 is a conceptual diagram illustrating for model of two unacknowledged mode peer entities.

FIG. 14 is a conceptual diagram illustrating for model of two unacknowledged mode peer entities.

In UM (Unacknowledged Mode), in-sequence delivery to higher layers is provided, but no retransmissions of missing PDUs are requested. UM is typically used for services such as VoIP where error-free delivery is of less importance compared to short delivery time. TM (Transparent Mode), although supported, is only used for specific purposes such as random access.

Unacknowledged mode (UM) supports segmentation/reassembly and in-sequence delivery, but not retransmissions. This mode is used when error-free delivery is not required, for example voice-over IP, or when retransmissions cannot be requested, for example broadcast transmissions on MTCH and MCCH using MBSFN.

When a transmitting UM RLC entity forms UMD PDUs from RLC SDUs, the transmitting UM RLC entity may i) segment and/or concatenate the RLC SDUs so that the UMD PDUs fit within the total size of RLC PDU(s) indicated by lower layer at the particular transmission opportunity notified by lower layer; and ii) include relevant RLC headers in the UMD PDU.

When a receiving UM RLC entity receives UMD PDUs, the receiving UM RLC entity may i) detect whether or not the UMD PDUs have been received in duplication, and discard duplicated UMD PDUs; ii) reorder the UMD PDUs if they are received out of sequence; iii) detect the loss of UMD PDUs at lower layers and avoid excessive reordering delays; iv) reassemble RLC SDUs from the reordered UMD PDUs (not accounting for RLC PDUs for which losses have been detected) and deliver the RLC SDUs to upper layer in ascending order of the RLC SN; and v) discard received UMD PDUs that cannot be reassembled into a RLC SDU due to loss at lower layers of an UMD PDU which belonged to the particular RLC SDU.

At the time of RLC re-establishment, the receiving UM RLC entity may reassemble RLC SDUs from the UMD PDUs that are received out of sequence and deliver them to upper layer, if possible; ii) discard any remaining UMD PDUs that could not be reassembled into RLC SDUs; and iii) initialize relevant state variables and stop relevant timers.

The receiving UM RLC entity may maintain a reordering window according to state variable VR(UH) as follows:

i) a SN falls within the reordering window if (VR(UH)−UM_Window_Size)≤SN<VR(UH);

ii) a SN falls outside of the reordering window otherwise.

When receiving an UMD PDU from lower layer, the receiving UM RLC entity may either discard the received UMD PDU or place it in the reception buffer.

If the received UMD PDU was placed in the reception buffer, the receiving UM RLC may update state variables, reassemble and deliver RLC SDUs to upper layer and start/stop t-Reordering as needed.

When t-Reordering expires, the receiving UM RLC entity may update state variables, reassemble and deliver RLC SDUs to upper layer and start t-Reordering as needed When an UMD PDU with SN=x is received from lower layer, the receiving UM RLC entity may discard the received UMD PDU, if VR(UR)<x<VR(UH) and the UMD PDU with SN=x has been received before; or if (VR(UH)−UM_Window_Size)≤x<VR(UR).

Else, the receiving UM RLC entity may place the received UMD PDU in the reception buffer.

When an UMD PDU with SN=x is placed in the reception buffer, the receiving UM RLC entity may update VR(UH) to x+1 and reassemble RLC SDUs from any UMD PDUs with SN that falls outside of the reordering window, remove RLC headers when doing so and deliver the reassembled RLC SDUs to upper layer in ascending order of the RLC SN if not delivered before, if x falls outside of the reordering window.

If VR(UR) falls outside of the reordering window, the receiving UM RLC entity may set VR(UR) to (VR(UH)−UM_Window_Size).

If the reception buffer contains an UMD PDU with SN=VR(UR), the receiving UM RLC entity may update VR(UR) to the SN of the first UMD PDU with SN>current VR(UR) that has not been received; and reassemble RLC SDUs from any UMD PDUs with SN<updated VR(UR), remove RLC headers when doing so and deliver the reassembled RLC SDUs to upper layer in ascending order of the RLC SN if not delivered before;

If t-Reordering is running and VR(UX)≤VR(UR); or if t-Reordering is running and VR(UX) falls outside of the reordering window and VR(UX) is not equal to VR(UH), the receiving UM RLC entity may stop and reset t-Reordering.

If t-Reordering is not running (includes the case when t-Reordering is stopped due to actions above) and VR(UH)>VR(UR), the receiving UM RLC entity may start t-Reordering, and set VR(UX) to VR(UH).

When t-Reordering expires, the receiving UM RLC entity may update VR(UR) to the SN of the first UMD PDU with SN≥VR(UX) that has not been received; and reassemble RLC SDUs from any UMD PDUs with SN<updated VR(UR), remove RLC headers when doing so and deliver the reassembled RLC SDUs to upper layer in ascending order of the RLC SN if not delivered before.

If VR(UH)>VR(UR), the receiving UM RLC entity may start t-Reordering, and set VR(UX) to VR(UH).

Each transmitting UM RLC entity shall maintain the following state variables above mentioned:

a) VT(US): this state variable holds the value of the SN to be assigned for the next newly generated UMD PDU. It is initially set to 0, and is updated whenever the UM RLC entity delivers an UMD PDU with SN=VT(US).

Each receiving UM RLC entity shall maintain the following state variables above mentioned:

a) VR(UR)−UM receive state variable: this state variable holds the value of the SN of the earliest UMD PDU that is still considered for reordering. It is initially set to 0.

b) VR(UX)−UM t-Reordering state variable: this state variable holds the value of the SN following the SN of the UMD PDU which triggered t-Reordering.

c) VR(UH)−UM highest received state variable: this state variable holds the value of the SN following the SN of the UMD PDU with the highest SN among received UMD PDUs, and it serves as the higher edge of the reordering window. It is initially set to 0.

FIGS. 15A to 15F are conceptual diagrams illustrating for UMD PDU.

Figure 15A:
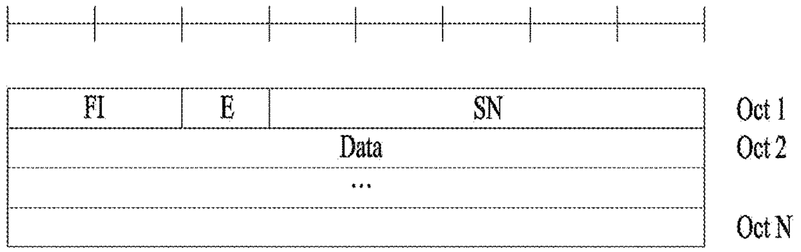
FIGS. 15A, 15B, 15C, 15D, 15E and 15F are conceptual diagrams illustrating for UMD PDU.
Figure 15B:
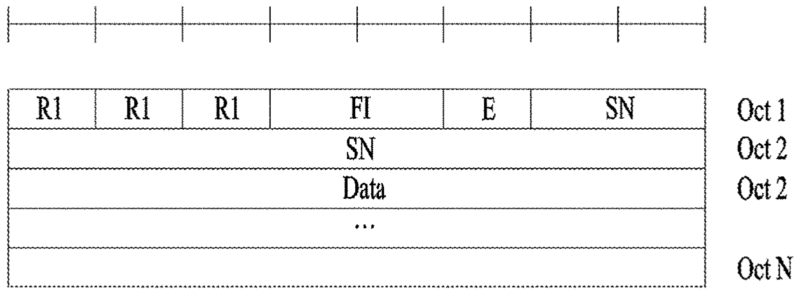
Figure 15C:
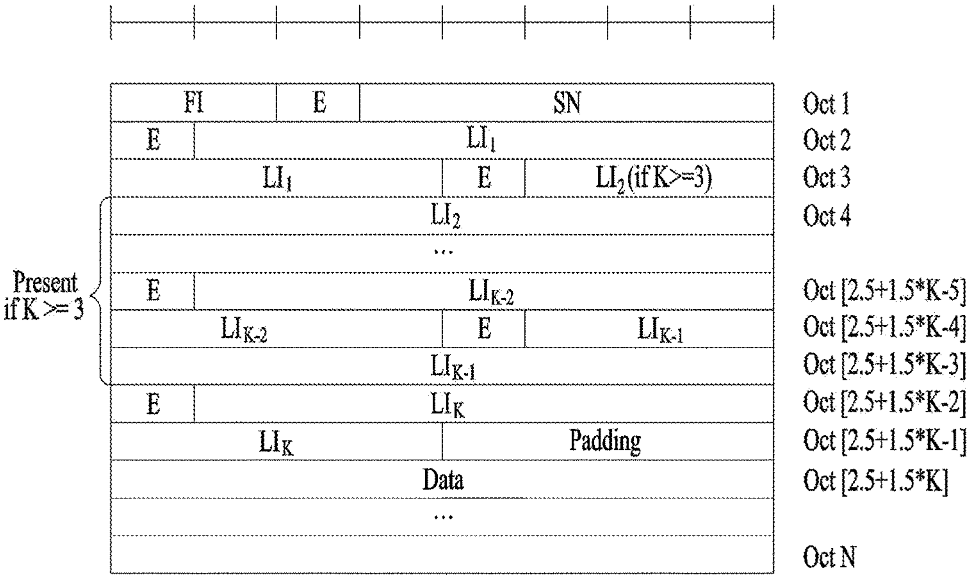
Figure 15D:
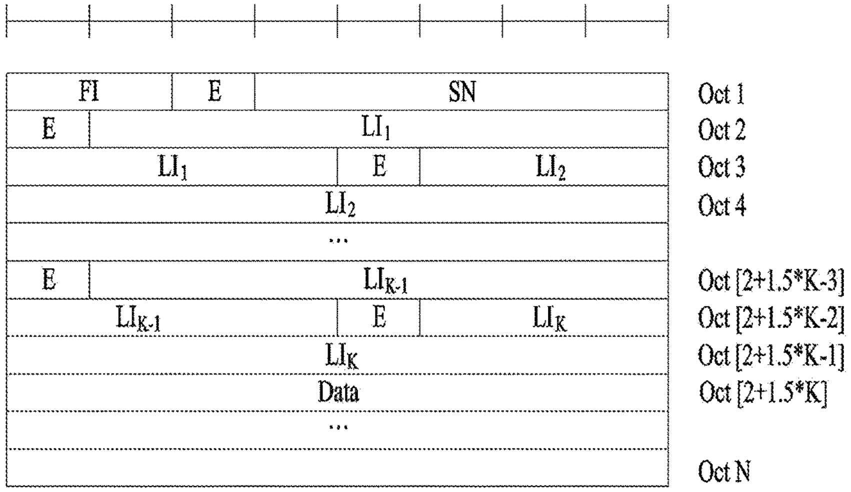
Figure 15E:
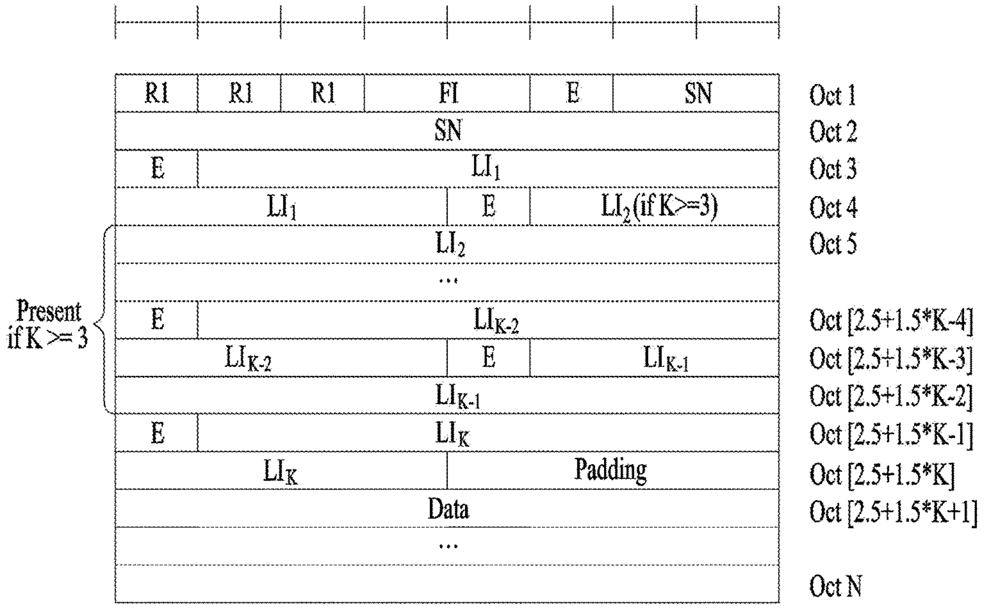
Figure 15F:
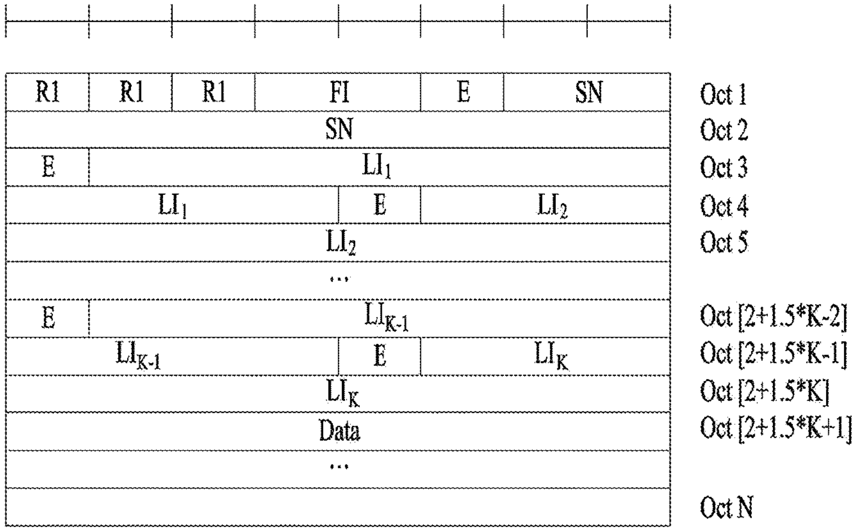

FIG. 15A is a diagram for a UMD PDU with 5 bit SN, FIG. 15B is a diagram for a UMD PDU with 10 bit SN, FIG. 15C is a diagram for a UMD PDU with 5 bit SN (Odd number of LIs, i.e. K=1, 3, 5, . . . ), FIG. 15D is a diagram for a UMD PDU with 5 bit SN (Even number of LIs, i.e. K=2, 4, 6, . . . ), FIG. 15E is a UMD PDU with 10 bit SN (Odd number of LIs, i.e. K=1, 3, 5, . . . ), and FIG. 15F is a diagram for a UMD PDU with 10 bit SN (Even number of LIs, i.e. K=2, 4, 6, . . . ).

UMD PDU consists of a Data field and an UMD PDU header. UMD PDU header consists of a fixed part (fields that are present for every UMD PDU) and an extension part (fields that are present for an UMD PDU when necessary). The fixed part of the UMD PDU header itself is byte aligned and consists of a FI, an E and a SN. The extension part of the UMD PDU header itself is byte aligned and consists of E(s) and LI(s).

An UM RLC entity is configured by RRC to use either a 5 bit SN or a 10 bit SN. When the 5 bit SN is configured, the length of the fixed part of the UMD PDU header is one byte. When the 10 bit SN is configured, the fixed part of the UMD PDU header is identical to the fixed part of the AMD PDU header, except for D/C, RF and P fields all being replaced with R1 fields. The extension part of the UMD PDU header is identical to the extension part of the AMD PDU header (regardless of the configured SN size).

An UMD PDU header consists of an extension part only when more than one Data field elements are present in the UMD PDU, in which case an E and a LI are present for every Data field element except the last. Furthermore, when an UMD PDU header consists of an odd number of LI(s), four padding bits follow after the last LI.

In the definition of each field in FIG. 15A to FIG. 15F, the bits in the parameters are represented in which the first and most significant bit is the left most bit and the last and least significant bit is the rightmost bit. Unless mentioned otherwise, integers are encoded in standard binary encoding for unsigned integers.

Data field: The Data field elements are mapped to the Data field in the order which they arrive to the RLC entity at the transmitter. The granularity of the Data field size is one byte; and the maximum Data field size is the maximum TB size minus the sum of minimum MAC PDU header size and minimum RLC PDU header size. A UMD PDU segment is mapped to the Data field. Zero RLC SDU segments and one or more RLC SDUs, one or two RLC SDU segments and zero or more RLC SDUs; the RLC SDU segments are either mapped to the beginning or the end of the Data field, a RLC SDU or RLC SDU segment larger than 2047 octets can only be mapped to the end of the Data field. When there are two RLC SDU segments, they belong to different RLC SDUs.

Sequence number (SN) field: the SN field indicates the sequence number of the corresponding UMD or AMD PDU. For an AMD PDU segment, the SN field indicates the sequence number of the original AMD PDU from which the AMD PDU segment was constructed from. The sequence number is incremented by one for every UMD or AMD PDU. Length is 5 bits or 10 bits (configurable) for UMD PDU.

Extension bit (E) field: Length is 1 bit. The E field indicates whether Data field follows or a set of E field and LI field follows. The interpretation of the E field is provided in Table 5 and Table 6.

TABLE 5

| Value | Description |
|---|---|
| 0 | Data field follows from the octet following the fixed part of the header |
| 1 | A set of E field and LI field follows from the octet following the fixed part of the header |

TABLE 6

| Value | Description |
|---|---|
| 0 | Data field follows from the octet following the LI field following this E field |
| 1 | A set of E field and LI field follows from the bit following the LI field following this E field |

Length Indicator (LI) field: Length is 11 bits. The LI field indicates the length in bytes of the corresponding Data field element present in the RLC data PDU delivered/received by an UM or an AM RLC entity. The first LI present in the RLC data PDU header corresponds to the first Data field element present in the Data field of the RLC data PDU, the second LI present in the RLC data PDU header corresponds to the second Data field element present in the Data field of the RLC data PDU, and so on. The value 0 is reserved.

Framing Info (FI) field: Length is 2 bits. The FI field indicates whether a RLC SDU is segmented at the beginning and/or at the end of the Data field. Specifically, the FI field indicates whether the first byte of the Data field corresponds to the first byte of a RLC SDU, and whether the last byte of the Data field corresponds to the last byte of a RLC SDU. The interpretation of the FI field is provided in Table 7.

TABLE 7

| Value | Description |
|---|---|
| 00 | First byte of the Data field corresponds to the first byte of a RLC SDU. Last byte of the Data field corresponds to the last byte of a RLC SDU. |
| 01 | First byte of the Data field corresponds to the first byte of a RLC SDU. Last byte of the Data field does not correspond to the last byte of a RLC SDU. |
| 10 | First byte of the Data field does not correspond to the first byte of a RLC SDU. Last byte of the Data field corresponds to the last byte of a RLC SDU. |
| 11 | First byte of the Data field does not correspond to the first byte of a RLC SDU. Last byte of the Data field does not correspond to the last byte of a RLC SDU. |

Figure 16:
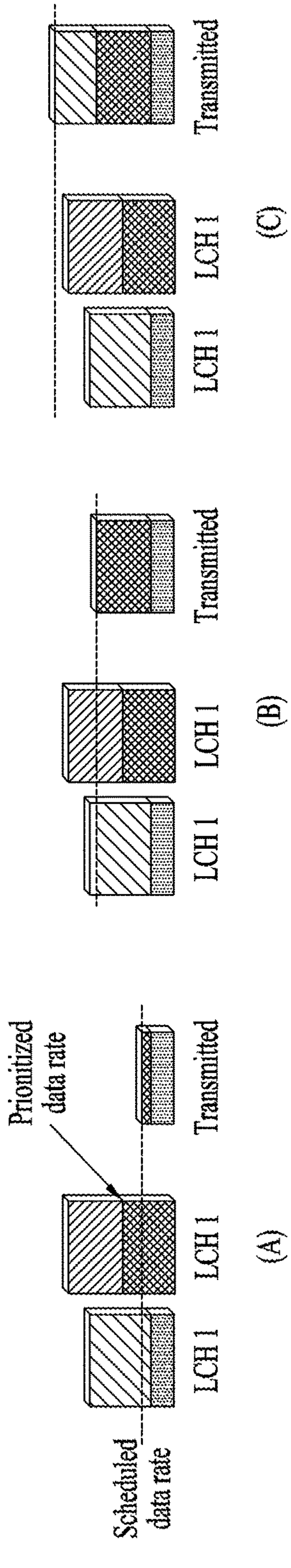
FIG. 16 is a diagram for prioritization of two logical channels for three different uplink grants.

FIG. 16 is a diagram for prioritization of two logical channels for three different uplink grants.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the buffer is empty. This is illustrated in FIG. 6.

Regarding FIG. 16, it may be assumed that a priority of the logical channel 1 (LCH 1) is higher than a priority of the logical channel 2 (LCH 2). In case of (A), all prioritized data of the LCH 1 can be transmitted and a portion of prioritized data of the LCH 2 can be transmitted until amount of the scheduled data rate. In case of (B), all prioritized data of the LCH 1 and all prioritized data of the LCH 2 can be transmitted. In case of (C) all prioritized data of the LCH 1 and all prioritized data of the LCH 2 can be transmitted and a portion of data of the LCH 1 can be further transmitted.

The Logical Channel Prioritization procedure is applied when a new transmission is performed. RRC controls the scheduling of uplink data by signaling for each logical channel: priority where an increasing priority value indicates a lower priority level, prioritisedBitRate which sets the Prioritized Bit Rate (PBR), bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall perform the following Logical Channel Prioritization procedure when a new transmission is performed:

The UE shall allocate resources to the logical channels in the following steps:

i) Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

ii) Step 2: the UE shall decrement Bj by the total size of MAC SDUs served to logical channel j in Step 1 (The value of Bj can be negative.)

iii) Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

i) the UE should not segment an RLC SDU (or partially transmitted SDU or retransmitted RLC PDU) if the whole SDU (or partially transmitted SDU or retransmitted RLC PDU) fits into the remaining resources; ii) if the UE segments an RLC SDU from the logical channel, it shall maximize the size of the segment to fill the grant as much as possible; iii) the UE should maximize the transmission of data, and vi) if the UE is given an UL grant size that is equal to or larger than 4 bytes while having data available for transmission, the UE shall not transmit only padding BSR and/or padding (unless the UL grant size is less than 7 bytes and an AMD PDU segment needs to be transmitted).

The UE shall not transmit data for a logical channel corresponding to a radio bearer that is suspended. For the Logical Channel Prioritization procedure, the UE shall take into account the following relative priority in decreasing order:

- MAC control element for C-RNTI or data from UL-CCCH;
- MAC control element for BSR, with exception of BSR included for padding;
- MAC control element for PHR or Extended PHR;
- data from any Logical Channel, except data from UL-CCCH;
- MAC control element for BSR included for padding.

In the prior art, when the UE performs LCP procedure, if the UE is provided an UL grant which is equal to or larger than 4 bytes, the UE shall not transmit a MAC PDU by only padding the MAC PDU. The intention is not to transmit padding only MAC PDU when the UE receives an UL grant which is large enough to contain the data. 4 bytes was determined by considering 2 byte of MAC header (R/R/E/LCID/F/L), 1 bytes of RLC header, and 1 byte of MAC payload.

In ProSe communication, in MAC, the SL-SCH subheader consists of the seven header fields V/R/R/R/R/SRC/DST, which are total 6 bytes, and in RLC, only RLC UM is used.

As new SL-SCH subheader is introduced, 4 bytes condition should be reconsidered for ProSe. Otherwise, the ProSe UE shall include the PC5 data even though there is no enough room to contain PC5 data at all.

Figure 17:
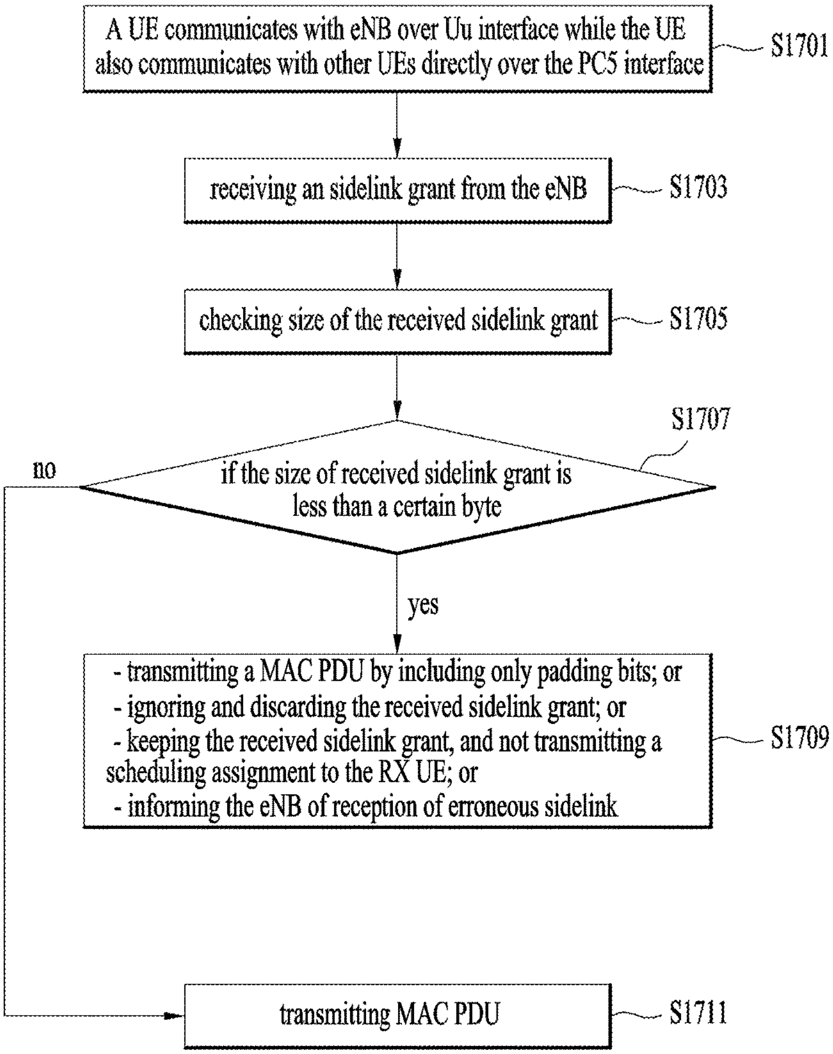
FIG. 17 is a diagram for avoiding transmitting MAC PDU having padding only in a D2D communication system according to embodiments of the present invention

FIG. 17 is a diagram for avoiding transmitting MAC PDU having padding only in a D2D communication system according to embodiments of the present invention.

In this invention, when the UE receives a sidelink grant, if the sidelink grant is larger enough to contain SL-SCH MAC subheader, R/R/E/LCID/F/L MAC subheader, RLC subheader, and 1 byte of data, the UE shall not transmit a MAC PDU which only includes padding.

A UE communicates with other UEs directly over the PC5 interface (S1701). A UE is configured with at least one sidelink logical channel over which the UE transmits/receives data directly to/from other UE.

When a TX UE receives a sidelink grant from the eNB (S1703), the TX UE checks the size of the received sidelink grant (S1705).

If the received sidelink grant indicate that the transmitting resource is less than XX+1 bytes (i.e. a minimum size of MAC PDU is XX bytes), the TX UE transmits a MAC PDU by including only padding bits, or the TX UE ignores the received sidelink grant and discards it, or the TX UE keeps the received sidelink grant, but the TX UE does not transmit a scheduling assignment to the RX UE (S1707).

If the TX UE keeps the received sidelink grant, but the TX UE does not transmit a scheduling assignment to the RX UE, the TX UE generates a MAC PDU by including only padding bits; or the TX UE does not generate any MAC PDU containing RLC PDUs from STCH. In this case, the UE may generate a MAC PDU without containing any RLC PDUs from STCH, e.g., a MAC PDU containing only MAC control element(s).

If the received sidelink grant indicate that the transmitting resource is less than XX+1 bytes, the TX UE informs the eNB of reception of erroneous sidelink grant by indicating: i) discarding the received sidelink grant, ii) not transmitting the scheduling assignment, iii) not transmitting RLC PDUs from STCH, or iv) transmitting only padding MAC PDU.

Preferably, the minimum size of MAC PDU (i.e. XX bytes) includes only MAC header and Radio Link Control (RLC) header for Sidelink Traffic Channel (STCH), i.e., including no RLC SDU from STCH.

For example, XX is determined as 9 assuming the followings: 6 bytes of sidelink-shared channel (SL-SCH) MAC subheader, 2 bytes of MAC subheader including R/R/E/LCID/F/L field, 1 byte of RLC subheader for RLC UM.

Preferably, the minimum size of MAC PDU corresponds to 9 bytes.

Else if the received sidelink grant is equal to or larger than XX+1 bytes, the TX UE transmits a MAC PDU including at least one byte of RLC SDU, or the TX UE transmits the scheduling assignment to the RX UE, or the TX UE generates a MAC PDU by including at least one byte of MAC SDU, i.e., the TX UE shall not generate a MAC PDU by including only padding, or the TX UE transmits the MAC PDU to the RX UE (S1711).

In this case, if the received sidelink grant is equal to or larger than 10 bytes, the TX UE transmits the scheduling assignment to the RX UE, or the TX UE generates a MAC PDU by including at least one byte of MAC SDU, i.e., the TX UE shall not generate a MAC PDU by including only padding, or the TX UE transmits the MAC PDU to the RX UE.

Accordingly, if the UE is given an SL grant size that is equal to or larger than 10 bytes while having data available for transmission, the UE shall not transmit only padding.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for a transmitting User Equipment (TX UE) operating in a wireless communication system, the method comprising:

receiving, from an eNB, a sidelink grant for the TX UE to communicate with a receiving UE (RX UE) directly;

checking a size of the received sidelink grant; and when the size of the received sidelink grant is larger than a minimum size of MAC PDU that includes 6 bytes of a sidelink-shared channel (SL-SCH) MAC subheader, 2 bytes of a MAC subheader, and 1 byte of a RLC subheader:

generating a Medium Access Control Protocol Data Unit (MAC PDU) other than a MAC PDU that includes only padding bits; and transmitting the generated MAC PDU to the RX UE.

2. The method according to claim 1, wherein the minimum size of MAC PDU corresponds to 9 bytes, and wherein when the size of received sidelink grant is equal to or larger than 10 bytes, the MAC PDU is generated by including at least one byte of a Radio Link Control Service Data Unit (RLC SDU).

3. The method according to claim 2, wherein the 10 bytes includes the 6 bytes of the SL-SCH MAC subheader, the 2 bytes of the MAC subheader, the 1 byte of the RLC subheader, and the 1 byte of the RLC SDU.

4. The method according to claim 2, wherein when the size of the received sidelink grant is less than the 10 bytes, the TX UE transmits the MAC PDU that includes only padding bits; or the TX UE ignores and discards the received sidelink grant; or the TX UE keeps the received sidelink grant, but the TX UE does not transmit a scheduling assignment to the RX UE; or the TX UE informs the eNB of reception of erroneous sidelink.

5. A transmitting User Equipment (TX UE) operating in a wireless communication system, the TX UE comprising:

a Radio Frequency (RF) module; and a processor configured to control the RF module, wherein the processor is configured to:

receive, from an eNB, a sidelink grant for the TX UE to communicate with a receiving UE (RX UE) directly, check a size of the received sidelink grant, and when the size of the received sidelink grant is larger than a minimum size of MAC PDU that includes 6 bytes of a sidelink-shared channel (SL-SCH) MAC subheader, 2 bytes of a MAC subheader, and 1 byte of a RLC subheader:

generate a Medium Access Control Protocol Data Unit (MAC PDU) other than a MAC PDU that includes only padding bits, and transmit the generated MAC PDU to the RX UE.

6. The TX UE according to claim 5, wherein the minimum size of MAC PDU corresponds to 9 bytes, and wherein when the size of received sidelink grant is equal to or larger than 10 bytes, the MAC PDU is generated by including at least one byte of a Radio Link Control Service Data Unit (RLC SDU).

7. The TX UE according to claim 6, wherein the 10 bytes includes the 6 bytes of the SL-SCH MAC subheader, the 2 bytes of the MAC subheader, the 1 byte of the RLC subheader, and the 1 byte of the RLC SDU.

8. The TX UE according to claim 6, wherein when the size of the received sidelink grant is less than the 10 bytes, the processor is configured to transmit the MAC PDU that includes only padding bits; or the processor is configured to ignore and discard the received sidelink grant; or the processor is configured to keep the received sidelink grant, but the processor is configured not to transmit a scheduling assignment to the RX UE; or the processor is configured to inform the eNB of reception of erroneous sidelink.

9. The method of claim 1, further comprising:

when the size of the received sidelink grant is not larger than the minimum size of MAC PDU that includes the 6 bytes of a sidelink-shared channel (SL-SCH) MAC subheader, the 2 bytes of a MAC subheader, and the 1 byte of a RLC subheader:

generating the MAC PDU that includes only the padding bits; and transmitting the generated MAC PDU that includes only the padding bits to the RX UE.

10. The TX UE according to claim 5, wherein, when the size of the received sidelink grant is not larger than the minimum size of MAC PDU that includes the 6 bytes of a sidelink-shared channel (SL-SCH) MAC subheader, the 2 bytes of a MAC subheader, and the 1 byte of a RLC subheader, the processor is further configured to:

generate the MAC PDU that includes only the padding bits; and transmit the generated MAC PDU that includes only the padding bits to the RX UE.

* * * * *